United States Patent
Hamada et al.

(10) Patent No.: US 6,966,706 B2
(45) Date of Patent: Nov. 22, 2005

(54) LIGHT-EMITTING DEVICE AND OPTICAL TRANSMISSION UNIT

(75) Inventors: Tsutomu Hamada, Ashigarakami-gun (JP); Shinya Kyozuka, Ashigarakami-gun (JP); Tomo Baba, Ashigarakami-gun (JP); Hideo Nakayama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/902,308

(22) Filed: Jul. 30, 2004

(65) Prior Publication Data

US 2005/0002619 A1 Jan. 6, 2005

Related U.S. Application Data

(62) Division of application No. 10/292,454, filed on Nov. 13, 2002, now Pat. No. 6,814,501.

(30) Foreign Application Priority Data

Nov. 14, 2001 (JP) .................... 2001-348702

(51) Int. Cl.[7] .................... G02B 6/36; H01S 3/00
(52) U.S. Cl. .................... 385/88; 372/38.02
(58) Field of Search .................... 372/38.02, 38.04, 372/38.07, 38.1, 43, 50, 64, 68; 385/88, 89, 385/92, 94

(56) References Cited

U.S. PATENT DOCUMENTS

| | | | |
|---|---|---|---|
| 5,473,716 A | * 12/1995 | Lebby et al. | 385/54 |
| 5,719,891 A | * 2/1998 | Jewell | 372/45 |
| 5,812,571 A | * 9/1998 | Peters | 372/36 |
| 5,997,185 A | 12/1999 | Kropp | |
| 6,154,326 A | 11/2000 | Ueyanagi et al. | |
| 6,198,756 B1 | 3/2001 | Caprara et al. | |
| 6,243,508 B1 | 6/2001 | Jewell et al. | |
| 6,272,160 B1 | 8/2001 | Stronczer | |
| 6,419,404 B1 | 7/2002 | Deri et al. | |
| 6,491,446 B1 | 12/2002 | Kryzak | |
| 6,509,992 B1 | 1/2003 | Goodwill | |
| 6,526,076 B2 | 2/2003 | Cham et al. | |
| 6,636,540 B2 | 10/2003 | Uebbing | |
| 6,751,242 B2 | * 6/2004 | Kaneko et al. | 372/43 |
| 6,782,018 B2 | * 8/2004 | Tatsuno et al. | 372/43 |
| 6,782,032 B2 | * 8/2004 | Kondow et al. | 372/92 |
| 6,821,026 B2 | * 11/2004 | Devine et al. | 385/89 |
| 2002/0090013 A1 | 7/2002 | Murry et al. | |
| 2003/0099273 A1 | 5/2003 | Murry et al. | |
| 2004/0021144 A1 | 2/2004 | Schrodinger | |

FOREIGN PATENT DOCUMENTS

| | | |
|---|---|---|
| JP | A 7-38205 | 2/1995 |
| JP | A 9-18423 | 1/1997 |

* cited by examiner

Primary Examiner—Dean A. Reichard
Assistant Examiner—Adolfo Nino
(74) Attorney, Agent, or Firm—Oliff & Berridge, PLC

(57) ABSTRACT

A light-emitting device includes 16 vertical-cavity surface-emitting laser diodes (VCSELs) disposed like a 4×4 grid, for example, in a sufficiently narrower range than the end surface of an optical fiber. The 16 VCSELs disposed in the light-emitting device emit optical signals in the same direction. Since the VCSELs are disposed with a concentration in the sufficiently narrower range than the end surface of the optical fiber as described above, if the optical signals emitted from the VCSELs are spread, almost all optical signals generated by the light-emitting device are incident on the end surface of the optical fiber and are transmitted through the optical fiber.

4 Claims, 4 Drawing Sheets

LIGHT-EMITTING DEVICE AND OPTICAL TRANSMISSION UNIT

This is a Division of application Ser. No. 10/292,454 filed Nov. 13, 2002, now U.S. Pat. No. 6,814,501 issued Nov. 9, 2004. The entire disclosure of the prior application is hereby incorporated by reference herein in its entirety.

The present disclosure relates to the subject matter contained in Japanese Patent Application No. 2001-348702 filed on Nov. 14, 2001, which is incorporated herein by reference in its entirety.

BACKGROUND OF THE INVENTION

Detailed Description of the Invention

1. Field of the Invention

This invention relates to a light-emitting device and an optical transmission unit for converting an electric signal into an optical signal and transmitting the optical signal.

2. Description of the Related Art

As a device for converting an electric signal into an optical signal, for example, a vertical-cavity surface-emitting laser diode (VCSEL) is in the actual use.

The VCSEL has the characteristics of small threshold current as compared with an end surface light-emitting laser diode and being easily put into an array.

Generally, the VCSEL has the features of low output as compared with a general laser diode and life shortened in proportion to the square or the cube of a current value if a drive current is increased.

For example, JP-A-7-38205 (Document 1) discloses a technique of generating an optical signal using a plurality of face light-emitting laser diodes.

However, in the technique disclosed in Document 1, a plurality of face light-emitting laser diodes each having a horizontal resonator, a waveguide, and a diffraction grating need to be disposed so that optical signals emitted from the face light-emitting laser diodes are gathered at one point, and it is hard to manufacture.

For example, JP-A-9-18423 (Document 2) discloses a laser diode array using a plurality of VCSELs for emitting different light wavelengths, a collimator array, and a condensing lens.

The laser diode array disclosed in Document 2 is used to transmit an optical signal by wavelength division multiplexing, and does not solve the problems of low output of VCSEL and shortening the life if the drive current is increased.

SUMMARY OF THE INVENTION

It is therefore an object of the invention to provide a light-emitting device capable of making up for the lowness of output of each vertical-cavity surface-emitting laser diode (VCSEL) and shortening of the life of the VCSEL if a drive current is increased and an optical transmission unit using the light-emitting device.

It is also an object of the invention to provide a light-emitting device of an array structure of a simple structure and an optical transmission unit using the light-emitting device.

[Light-Emitting Device]

To the ends, according to the invention, there is provided a light-emitting device including a plurality of vertical-cavity surface-emitting laser diodes for emitting an optical signal in the same direction and a drive circuit for driving the plurality of vertical-cavity surface-emitting laser diodes by the same signal.

[Optical Transmission Unit]

According to the invention, there is provided an optical transmission unit including a light-emitting device and a light guide for receiving an optical signal emitted from the light-emitting device at one end and transmitting the optical signal to another end. The light-emitting device includes a plurality of vertical-cavity surface-emitting laser diodes for emitting optical signals in the same direction and a drive circuit for driving the plurality of vertical-cavity surface-emitting laser diodes by the same signal. The optical signals of the plurality of vertical-cavity surface-emitting laser diodes are transmitted through the light guide.

Preferably, the light-emitting device emits an optical signal to the one end of the light guide, which faces to an emission surface of the plurality of vertical-cavity surface-emitting laser diodes. Also, the plurality of vertical-cavity surface-emitting laser diodes are disposed in an area of the one end of the light guide.

Preferably, the plurality of vertical-cavity surface-emitting laser diodes are disposed like a grid.

Preferably, one of the plurality of vertical-cavity surface-emitting laser diodes is disposed like a coaxial.

Preferably, the light guide includes an optical dividing type light guide using a sheet-like light guide for splitting the optical signal and a plurality of optical transmission lines for transmitting the split optical signals.

DETAILEDE DESCRIPTION OF THE PREFERRED EMBODIMENTS

Referring now to the accompanying drawings, there is shown a preferred embodiment of the invention.

Figure 1A:
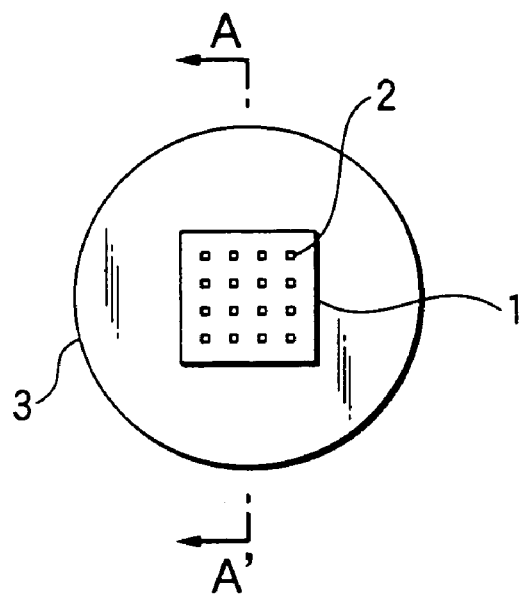
FIGS. 1A and 1B are drawings to show the positional relationship between a first light-emitting device and VCSELs according to the invention and the light incidence surface of an optical fiber.
Figure 1B:
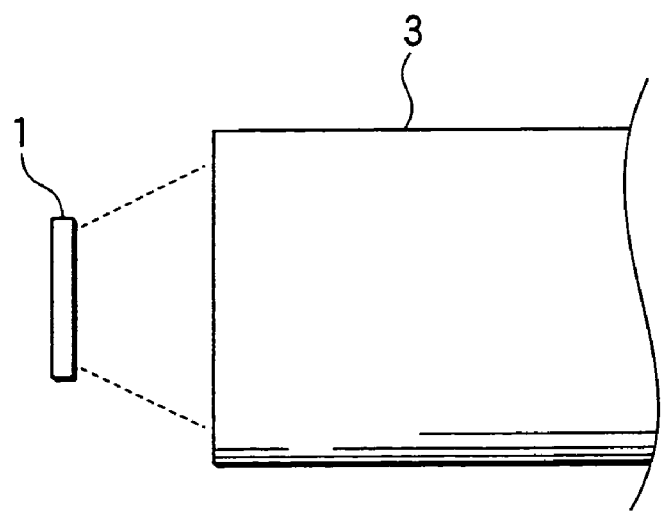

FIGS. 1A and 1B are drawings to show the positional relationship between a first light-emitting device 1 and VCSELs 2 thereof according to the invention and a light incidence surface of an optical fiber 3. FIG. 1A is a front view. FIG. 1B is a sectional view taken on line A–A' in FIG. 1A.

In FIG. 1A, for simplicity, only one of n (n≧2; in FIGS. 1 and 2, n=16) VCSELs 2 is denoted by the reference numeral 2.

As shown in FIG. 1A, in the light-emitting device 1, the 16 vertical-cavity surface-emitting laser diodes (VCSELs) 2 are disposed like a 4×4 grid, for example, in a sufficiently narrower range than the end surface of the optical fiber 3.

As shown in FIG. 1B, the 16 VCSELs 2 disposed in the light-emitting device 1 emit optical signals in the same direction.

Since the VCSELs 2 are disposed with a concentration in the sufficiently narrower range than the end surface of the optical fiber 3 as described above, if the optical signals emitted from the VCSELs 2 are spread as indicted by dotted lines in FIG. 1B, almost all optical signals generated by the light-emitting device 1 are incident on the end surface of the optical fiber 3 and are transmitted through the optical fiber 3.

Figure 2:
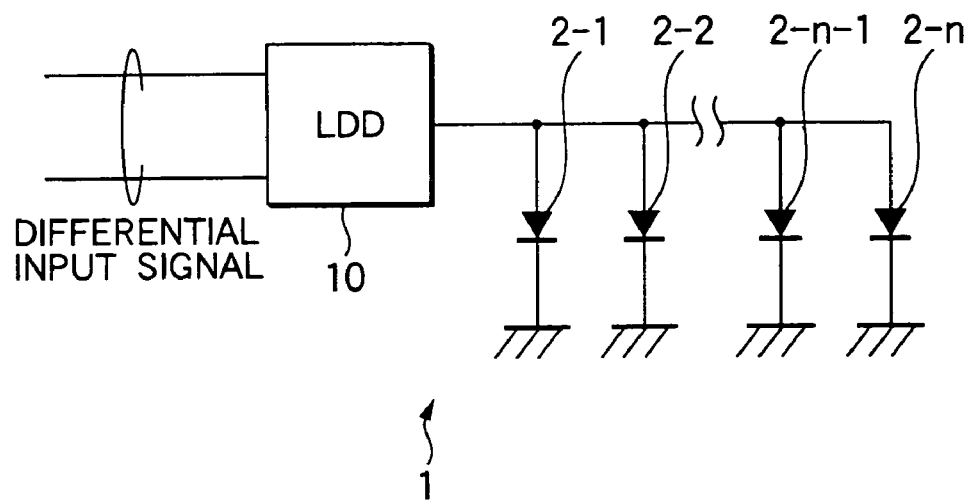
FIG. 2 is a circuit diagram of the light-emitting device shown in FIG. 1.

FIG. 2 is a circuit diagram of the light-emitting device 1 shown in FIG. 1.

As shown in FIG. 2, differential signals from the outside are given to the light-emitting device 1.

A laser diode driver (LDD) 10 generates the same drive signal for VCSELs 2-1 to 2-$n$ (2-16) from one differential input signal, and supplies 1/16 equally to each of the VCSELs 2-1 to 2-16.

Figure 3:
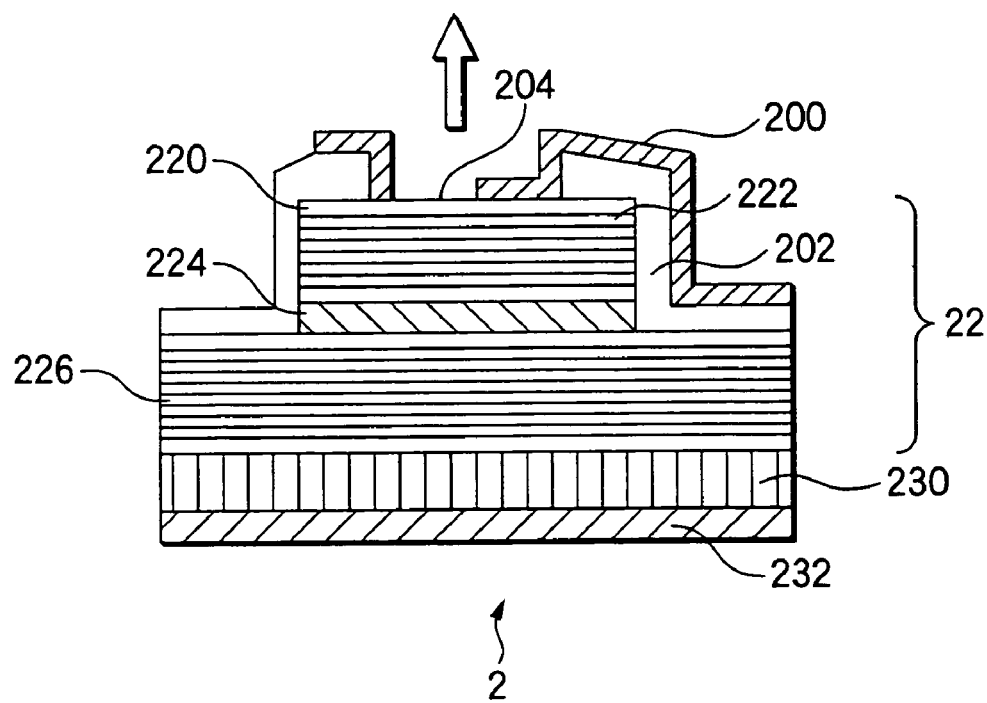
FIG. 3 is a drawing to show an outline of the structure of each VCSEL shown in FIGS. 1 and 2.

FIG. 3 is a drawing to show an outline of the structure of each VCSEL 2 shown in FIGS. 1 and 2.

As shown in FIG. 3, the VCSEL 2 is made up of layers such as an upper electrode 200, an interlayer insulating film 202, a vertical resonance section 22, a GaAs substrate 230, and a lower electrode 232. The vertical resonance section 22 is made up of layers such as a contact layer 220, an upper DBR layer 222, and an AlAs layer 224.

As shown in FIGS. 2 and 3, each of the VCSELs 2-1 to 2-16 converts the same drive signal supplied from the LDD 10 into an optical signal and emits the optical signal from an emission port 204. As shown in FIG. 1B, as the whole of the VCSELs 2-1 to 2-16, one optical signal is made incident on the end surface of the optical fiber 3.

As the optical fiber 3, an optical fiber having a comparatively large diameter, for example, a plastic optical fiber of φ 0.5 to 1 mm is preferred, in which case the grid pitch of the VCSELs 2-1 to 2-16 may be ten several $\mu$m to several tens $\mu$m.

If the light-emitting diode 1 is thus configured, the drive current flown into each of the VCSELs 2-1 to 2-16 can be made about 1/16 as compared with the case where one VCSEL 2 is used.

The life of the VCSEL is shortened in proportion to the square or the cube of the drive current value. Thus, if about 1/16 of the current value is used for each of the 16 VCSELs 2-1 to 2-16, the life of each of the VCSELs 2-1 to 2-16 can be extended to several hundred times as compared with the case where one VCSEL 2 is used.

The temperature rise of the VCSEL 2 can be lessened and the life of the VCSEL 2 can be furthermore prolonged.

Since large number of VCSELs 2 are used to generate one optical signal, it can compensate for the lowness of output when a single VCSEL 2 is used.

Since the light-emitting diode 1 may include the VCSELs arranged simply like a grid, the structure is very simple and easy.

[First Modification]

Figure 4:
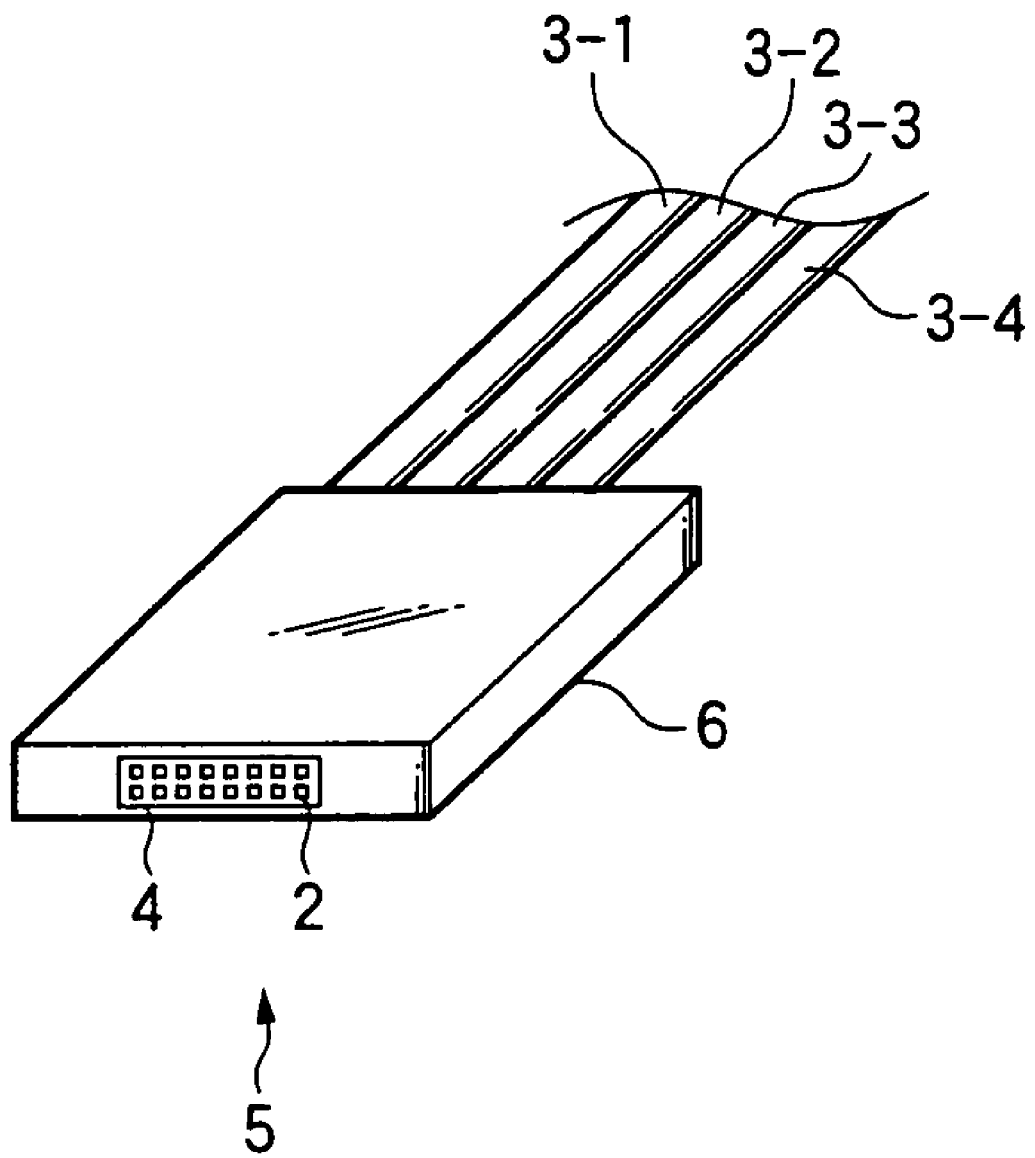
FIG. 4 is a drawing to show the configuration of a second light-emitting device and an optical transmission unit using the light-emitting device according to the invention.

FIG. 4 is a drawing to show the configuration of a second light-emitting device 4 and an optical transmission unit 5 using the light-emitting device 4 according to the invention.

Also in FIG. 4, for simplicity, only one of 16 VCSELs 2 is denoted by the reference numeral 2 as with the light-emitting device 1(A).

As shown in FIG. 4, the optical transmission unit 5 is made up of the light-emitting device 4, a sheet-like light guide (optical dividing type light guide) 6, and k (k≧2; in FIG. 4, k=4) optical fibers 3-1 to 3-$k$ (3-4).

The sheet-like light guide 6 is manufactured by forming an acrylic resin like a sheet, for example, for accepting an optical signal generated by the light-emitting device 4 from a surface where the light-emitting device 4 is disposed.

The sheet-like light guide 6 scatters the optical signal accepted from a surface (incidence surface) facing to an emission port 204 of the VCSEL 2 of the light-emitting device 4 (FIG. 3) and guides the optical signal to an opposed surface of the sheet-like guide 6 to guide to and make the optical signal incident on a light incidence surface of the optical fibers 3-1 to 3-4.

The optical fibers 3-1 to 3-4 transmit the optical signal emitted from the surface (emission surface) facing to the incidence surface of the sheet-like light guide 6.

The circuit configuration of the light-emitting device 4 is the same as that of the light-emitting device 1 shown in FIG. 2. In the light-emitting device 4, a set of the 16 VCSELs 2 is disposed like a 2×8 grid in a narrower range than the incidence surface of the sheet-like light guide 6 so that the set of the VCSELs 2 becomes a shape suitable for the incidence surface of the sheet-like light guide 6.

The light-emitting device 4 is disposed in the proximity of the sheet-like light guide 6 or is placed in intimate contact with the sheet-like light guide 6 so that the emission ports 204 of the 16 VCSELs 2 (FIG. 3) face to the incidence surface of the sheet-like light guide 6.

According to the optical transmission unit 5, the optical signal generated by the light-emitting device 4 can be accepted efficiently by the sheet-like light guide 6 for dividing the optical signal and guiding the optical signal into the optical fibers 3-1 to 3-4 for transmission.

[Second Modification]

Figure 5:
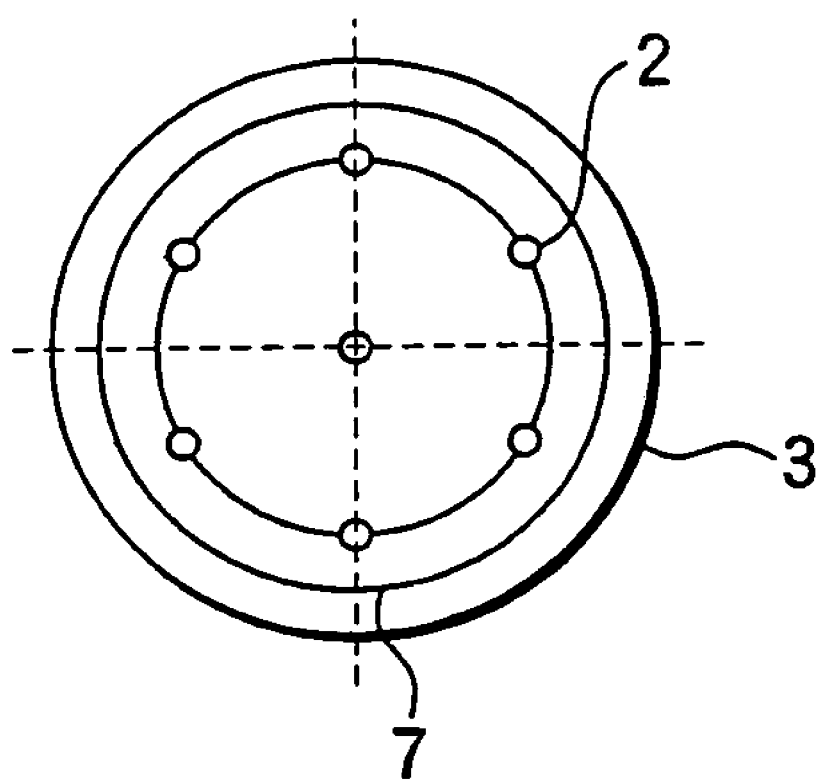
FIG. 5 is a drawing to show the configuration of a third light-emitting device according to the invention.

FIG. 5 is a drawing to show the configuration of a third light-emitting device 7 according to the invention.

Also in FIG. 5, for simplicity, only one of a plurality of VCSELs 2 is denoted by the reference numeral 2.

As shown in FIG. 5, the light-emitting device 7 includes one VCSEL 2 placed at a position facing to the center of an optical fiber 3.

Further, the light-emitting device 7 includes m (m≧1; in FIG. 5, m=6) VCSELs 2 placed on the circumference of a circle sufficiently narrower than the end surface of the optical fiber 3 with the one VCSEL 2 being the center thereof, as indicated by the dotted line in FIG. 5.

In addition to disposition of the VCSELs 2 like a grid, if the VCSELs 2 are disposed as shown in FIG. 5, similar advantages to those of the light-emitting device 1, 4 can also be provided.

As described above, the light-emitting device and the optical transmission unit using the light-emitting device according to the invention make it possible to make up for the lowness of output of each vertical-cavity surface-emitting laser diode (VCSEL) and shortening of the life of the VCSEL if the drive current is increased.

The structures of the light-emitting device and the optical transmission unit using the light-emitting device according to the invention are simple.

What is claimed is:
1. A light-emitting device comprising:
a first vertical-cavity surface-emitting laser diode; and
m vertical-cavity surface-emitting laser diodes disposed on a circumference of a circle, at a center of which is the first vertical-cavity surface-emitting laser diode, wherein m is equal to or more than three, and a diameter of the circle is less than or equal to 1 mm.

2. An optical transmission unit comprising:

a light-emitting device;

an optical fiber which receives an optical signal emitted from the light-emitting device at one end and transmits the optical signal to another end, wherein the light-emitting device includes:

a first vertical-cavity surface-emitting laser diode disposed at a position which corresponds to a light axis of the optical fiber; and n vertical-cavity surface-emitting laser diodes disposed on a circumference of a circle, which is narrower than an end surface of the optical fiber, and at a center of which is the first vertical-cavity surface-emitting laser diode, n being equal to or more than one, and wherein a diameter of the circle is less than or equal to 1 mm.

3. A light-emitting device comprising:

a first vertical-cavity surface-emitting laser diode;

m vertical-cavity surface-emitting laser diodes disposed on a circumference of a circle, at a center of which is the first vertical-cavity surface-emitting laser diode; and a drive circuit that always supplies a same signal to each of the first vertical-cavity surface-emitting laser diode and the m vertical-cavity surface-emitting laser diodes simultaneously when the first vertical-cavity surface-emitting laser diode and the m vertical-cavity surface-emitting laser diodes are driven, wherein m is equal to or more than three.

4. An optical transmission unit comprising:

a light-emitting device;

an optical fiber which receives an optical signal emitted from the light-emitting device at one end and transmits the optical signal to another end, wherein the light-emitting device includes:

a first vertical-cavity surface-emitting laser diode disposed at a position which corresponds to a light axis of the optical fiber;

n vertical-cavity surface-emitting laser diodes disposed on a circumference of a circle, which is narrower than an end surface of the optical fiber, and at a center of which is the first vertical-cavity surface-emitting laser diode, n being equal to or more than one; and a drive circuit that always supplies a same signal to each of the first vertical-cavity surface-emitting laser diode and the n vertical-cavity surface-emitting laser diodes simultaneously when the first vertical-cavity surface-emitting laser diode and the n vertical-cavity surface-emitting laser diodes are driven.

* * * * *